(12) United States Patent
Lane et al.

(10) Patent No.: US 9,561,476 B2
(45) Date of Patent: *Feb. 7, 2017

(54) CATALYST CONTAINING OXYGEN TRANSPORT MEMBRANE

(71) Applicants: Jonathan A. Lane, Amherst, NY (US); Jamie R. Wilson, Maynard, MA (US); Gervase Maxwell Christie, Amherst, NY (US); Nathalie Petigny, Velleron (FR); Christos Sarantopoulos, Aix-en-Provence (FR)

(72) Inventors: Jonathan A. Lane, Amherst, NY (US); Jamie R. Wilson, Maynard, MA (US); Gervase Maxwell Christie, Amherst, NY (US); Nathalie Petigny, Velleron (FR); Christos Sarantopoulos, Aix-en-Provence (FR)

(73) Assignee: PRAXAIR TECHNOLOGY, INC., Danbury, CT (US)

( * ) Notice: Subject to any disclaimer, the term of this patent is extended or adjusted under 35 U.S.C. 154(b) by 973 days.

This patent is subject to a terminal disclaimer.

(21) Appl. No.: 13/672,975

(22) Filed: Nov. 9, 2012

(65) Prior Publication Data

US 2013/0072375 A1   Mar. 21, 2013

Related U.S. Application Data

(63) Continuation-in-part of application No. 12/968,699, filed on Dec. 15, 2010, now Pat. No. 8,323,463.

(51) Int. Cl.
*H01M 8/10* (2016.01)
*C25B 13/04* (2006.01)
(Continued)

(52) U.S. Cl.
CPC ........... *B01D 71/024* (2013.01); *B01D 53/228* (2013.01); *B01D 69/12* (2013.01); *B01J 23/002* (2013.01);
(Continued)

(58) Field of Classification Search
None
See application file for complete search history.

(56) References Cited

U.S. PATENT DOCUMENTS 2,593,507 A   4/1952   Wainer
2,692,760 A   10/1954  Flurschutz
(Continued)

FOREIGN PATENT DOCUMENTS

DE    10330859 A1    2/2004
DE   102004038435 A1  2/2006
(Continued)

OTHER PUBLICATIONS

Sylvain Deville; "Freeze-Casting of Porous Ceramics: A Review of Current Achievements and Issues"; Advanced Engineering Materials 2008, 10, No. 3, pp. 155-169.
(Continued)

*Primary Examiner* — Krishnan S Menon
*Assistant Examiner* — Ryan B Huang
(74) *Attorney, Agent, or Firm* — Ralph J. Mancini (57) ABSTRACT

A composite oxygen transport membrane having a dense layer, a porous support layer and an intermediate porous layer located between the dense layer and the porous support layer. Both the dense layer and the intermediate porous layer are formed from an ionic conductive material to conduct oxygen ions and an electrically conductive material to conduct electrons. The porous support layer has a high permeability, high porosity, and a microstructure exhibiting substantially uniform pore size distribution as a result of
(Continued)

using PMMA pore forming materials or a bi-modal particle size distribution of the porous support layer materials. Catalyst particles selected to promote oxidation of a combustible substance are located in the intermediate porous layer and in the porous support adjacent to the intermediate porous layer. The catalyst particles can be formed by wicking a solution of catalyst precursors through the porous support toward the intermediate porous layer.

19 Claims, 3 Drawing Sheets

(51) Int. Cl.
  C25C 7/04      (2006.01)
  B01D 53/22     (2006.01)
  H01M 8/12      (2016.01)
  B01D 71/02     (2006.01)
  B01D 69/12     (2006.01)
  C01B 13/02     (2006.01)
  B01J 23/00     (2006.01)
  B01J 29/10     (2006.01)
  B01J 23/86     (2006.01)
  B01J 35/00     (2006.01)
  B01J 35/02     (2006.01)
  B01J 35/06     (2006.01)
  B01J 35/10     (2006.01)
  B01J 37/02     (2006.01)
  H01M 4/86      (2006.01)
  H01M 4/88      (2006.01)
  H01M 4/90      (2006.01)

(52) U.S. Cl.
  CPC ........... *B01J 23/862* (2013.01); *B01J 29/10* (2013.01); *B01J 35/002* (2013.01); *B01J 35/023* (2013.01); *B01J 35/065* (2013.01); *B01J 35/109* (2013.01); *B01J 37/0201* (2013.01); *B01J 37/0213* (2013.01); *C01B 13/0255* (2013.01); *H01M 4/8621* (2013.01); *H01M 4/885* (2013.01); *H01M 4/9033* (2013.01); *H01M 8/1246* (2013.01); *B01D 2325/021* (2013.01); *B01D 2325/10* (2013.01); *B01J 2523/00* (2013.01); *C01B 2210/0046* (2013.01); *Y02E 60/521* (2013.01); *Y02E 60/525* (2013.01); *Y02P 70/56* (2015.11)

(56) References Cited

U.S. PATENT DOCUMENTS

| | | |
|---|---|---|
| 3,282,803 A | 11/1966 | Poepel et al. |
| 3,317,298 A | 5/1967 | Klomp et al. |
| 3,770,621 A | 11/1973 | Collins et al. |
| 3,861,723 A | 1/1975 | Kunz et al. |
| 3,868,817 A | 3/1975 | Marion et al. |
| 3,930,814 A | 1/1976 | Gessner |
| 3,976,451 A | 8/1976 | Blackmer et al. |
| 4,013,592 A | 3/1977 | Matsuoka et al. |
| 4,128,776 A | 12/1978 | Bonaquist et al. |
| 4,153,426 A | 5/1979 | Wintrell |
| 4,162,993 A | 7/1979 | Retallick |
| 4,175,153 A | 11/1979 | Dobo et al. |
| 4,183,539 A | 1/1980 | French et al. |
| 4,206,803 A | 6/1980 | Finnemore et al. |
| 4,261,167 A | 4/1981 | Paull et al. |
| 4,292,209 A | 9/1981 | Marchant et al. |
| 4,350,617 A | 9/1982 | Retallick et al. |
| 4,357,025 A | 11/1982 | Eckart |
| 4,365,021 A | 12/1982 | Pirooz |
| 4,373,575 A | 2/1983 | Hayes |
| 4,402,871 A | 9/1983 | Retallick |
| 4,609,383 A | 9/1986 | Bonaventura et al. |
| 4,631,238 A | 12/1986 | Ruka |
| 4,650,814 A | 3/1987 | Keller |
| 4,651,809 A | 3/1987 | Gollnick et al. |
| 4,720,969 A | 1/1988 | Jackman |
| 4,734,273 A | 3/1988 | Haskell |
| 4,749,632 A | 6/1988 | Flandermeyer et al. |
| 4,783,085 A | 11/1988 | Wicks et al. |
| 4,791,079 A | 12/1988 | Hazbun |
| 4,862,949 A | 9/1989 | Bell, III |
| 4,866,013 A | 9/1989 | Anseau et al. |
| 4,878,835 A | 11/1989 | Martens |
| 5,021,137 A | 6/1991 | Joshi et al. |
| 5,035,726 A | 7/1991 | Chen et al. |
| 5,061,297 A | 10/1991 | Krasberg |
| 5,143,751 A | 9/1992 | Richard et al. |
| 5,169,506 A | 12/1992 | Michaels |
| 5,169,811 A | 12/1992 | Cipollini et al. |
| 5,171,646 A | 12/1992 | Rohr |
| 5,185,301 A | 2/1993 | Li et al. |
| 5,205,990 A | 4/1993 | Lawless |
| 5,240,480 A | 8/1993 | Thorogood et al. |
| 5,259,444 A | 11/1993 | Wilson |
| 5,286,686 A | 2/1994 | Haig et al. |
| 5,298,469 A | 3/1994 | Haig et al. |
| 5,302,258 A | 4/1994 | Renlund et al. |
| 5,306,411 A | 4/1994 | Mazanec et al. |
| 5,342,705 A | 8/1994 | Minh et al. |
| 5,356,730 A | 10/1994 | Minh et al. |
| 5,417,101 A | 5/1995 | Weich |
| 5,454,923 A | 10/1995 | Nachlas et al. |
| 5,478,444 A | 12/1995 | Liu et al. |
| 5,534,471 A | 7/1996 | Carolan et al. |
| 5,547,494 A | 8/1996 | Prasad et al. |
| 5,569,633 A | 10/1996 | Carolan et al. |
| 5,599,509 A | 2/1997 | Toyao et al. |
| 5,643,355 A | 7/1997 | Phillips et al. |
| 5,649,517 A | 7/1997 | Poola et al. |
| 5,707,911 A | 1/1998 | Rakhimov et al. |
| 5,750,279 A | 5/1998 | Carolan et al. |
| 5,804,155 A | 9/1998 | Farrauto et al. |
| 5,820,654 A | 10/1998 | Gottzman et al. |
| 5,820,655 A | 10/1998 | Gottzmann et al. |
| 5,837,125 A | 11/1998 | Prasad et al. |
| 5,855,762 A | 1/1999 | Phillips et al. |
| 5,864,576 A | 1/1999 | Nakatani et al. |
| 5,902,379 A | 5/1999 | Phillips et al. |
| 5,927,103 A | 7/1999 | Howard |
| 5,932,141 A | 8/1999 | Rostrop-Nielsen et al. |
| 5,944,874 A | 8/1999 | Prasad et al. |
| 5,964,922 A | 10/1999 | Keskar et al. |
| 5,975,130 A | 11/1999 | Ligh et al. |
| 5,980,840 A | 11/1999 | Kleefisch et al. |
| 6,010,614 A | 1/2000 | Keskar et al. |
| 6,035,662 A | 3/2000 | Howard et al. |
| 6,048,472 A | 4/2000 | Natarai et al. |
| 6,051,125 A | 4/2000 | Pham et al. |
| 6,070,471 A | 6/2000 | Westphal et al. |
| 6,077,323 A | 6/2000 | Natarai et al. |
| 6,110,979 A | 8/2000 | Nataraj et al. |
| 6,113,673 A | 9/2000 | Loutfy et al. |
| 6,114,400 A | 9/2000 | Nataraj et al. |
| 6,139,810 A | 10/2000 | Gottzmann et al. |
| 6,153,163 A | 11/2000 | Prasad et al. |
| 6,191,573 B1 | 2/2001 | Noda |
| RE37,134 E | 4/2001 | Wilson et al. |
| 6,214,066 B1 | 4/2001 | Natarai et al. |
| 6,214,314 B1 | 4/2001 | Abbott |
| 6,290,757 B1 | 9/2001 | Lawless |
| 6,293,084 B1 | 9/2001 | Drnevich et al. |
| 6,293,978 B2 | 9/2001 | Kleefisch et al. |
| 6,296,686 B1 | 10/2001 | Prasad et al. |
| 6,333,015 B1 | 12/2001 | Lewis |
| 6,352,624 B1 | 3/2002 | Crome et al. |
| 6,360,524 B1 | 3/2002 | Drnevich et al. |
| 6,368,491 B1 | 4/2002 | Cao et al. |
| 6,382,958 B1 | 5/2002 | Bool, III et al. |
| 6,394,043 B1 | 5/2002 | Bool, III et al. |

(56) References Cited

U.S. PATENT DOCUMENTS

| | | |
|---|---|---|
| 6,402,988 B1 | 6/2002 | Gottzmann et al. |
| 6,430,966 B1 | 8/2002 | Meinhardt et al. |
| 6,468,328 B2 | 10/2002 | Sircar et al. |
| 6,475,657 B1 | 11/2002 | Del-Gallo et al. |
| 6,492,290 B1 | 12/2002 | Dyer et al. |
| 6,532,769 B1 | 3/2003 | Meinhardt et al. |
| 6,537,514 B1 | 3/2003 | Prasad et al. |
| 6,562,104 B2 | 5/2003 | Bool, III et al. |
| 6,592,731 B1 | 7/2003 | Lawless |
| 6,638,575 B1 | 10/2003 | Chen et al. |
| 6,641,626 B2 | 11/2003 | Van Calcar et al. |
| 6,652,626 B1 | 11/2003 | Plee |
| 6,681,589 B2 | 1/2004 | Brudnicki |
| 6,695,983 B2 | 2/2004 | Prasad et al. |
| 6,783,750 B2 | 8/2004 | Shah et al. |
| 6,786,952 B1 | 9/2004 | Risd et al. |
| 6,811,904 B2 | 11/2004 | Gorte et al. |
| 6,846,511 B2 | 1/2005 | Visco et al. |
| 6,916,570 B2 | 7/2005 | Vaughey et al. |
| 7,037,876 B2 | 5/2006 | O'Brien et al. |
| 7,077,133 B2 | 7/2006 | Yagi et al. |
| 7,125,528 B2 | 10/2006 | Besecker et al. |
| 7,153,559 B2 | 12/2006 | Ito et al. |
| 7,179,323 B2 | 2/2007 | Stein et al. |
| 7,229,537 B2 | 6/2007 | Chen et al. |
| 7,261,751 B2 | 8/2007 | Dutta et al. |
| 7,320,778 B2 | 1/2008 | Whittenberger |
| 7,351,488 B2 | 4/2008 | Visco et al. |
| 7,374,601 B2 | 5/2008 | Bonchonsky et al. |
| 7,396,442 B2 | 7/2008 | Bagby et al. |
| 7,427,368 B2 | 9/2008 | Drnevich |
| 7,470,811 B2 | 12/2008 | Thiebaut |
| 7,510,594 B2 | 3/2009 | Wynn et al. |
| 7,534,519 B2 | 5/2009 | Cable et al. |
| 7,556,676 B2 | 7/2009 | Nagabhushana et al. |
| 7,588,626 B2 | 9/2009 | Gopalan et al. |
| 7,658,788 B2 | 2/2010 | Holmes et al. |
| 7,786,180 B2 | 8/2010 | Fitzpatrick |
| 7,833,314 B2 | 11/2010 | Lane et al. |
| 7,846,236 B2 | 12/2010 | Del-Gallo et al. |
| 7,856,829 B2 | 12/2010 | Shah et al. |
| 7,871,579 B2 | 1/2011 | Tentarelli |
| 7,901,837 B2 | 3/2011 | Jacobson et al. |
| 7,906,079 B2 | 3/2011 | Whittenberger et al. |
| 7,968,208 B2 | 6/2011 | Hodgson |
| 8,070,922 B2 | 12/2011 | Nelson et al. |
| 8,128,988 B2 | 3/2012 | Yasumoto et al. |
| 8,196,387 B2 | 6/2012 | Shah et al. |
| 8,201,852 B2 | 6/2012 | Linhorst et al. |
| 8,262,755 B2 | 9/2012 | Repasky et al. |
| 8,323,378 B2 | 12/2012 | Swami et al. |
| 8,323,463 B2 | 12/2012 | Christie et al. |
| 8,349,214 B1 | 1/2013 | Kelly et al. |
| 8,419,827 B2 | 4/2013 | Repasky et al. |
| 8,435,332 B2 | 5/2013 | Christie et al. |
| 8,455,382 B2 | 6/2013 | Carolan et al. |
| 8,658,328 B2 | 2/2014 | Suda et al. |
| 8,795,417 B2 | 8/2014 | Christie et al. |
| 8,894,944 B2 | 11/2014 | Larsen et al. |
| 2002/0073938 A1 | 6/2002 | Bool, III et al. |
| 2002/0078906 A1 | 6/2002 | Prasad et al. |
| 2002/0155061 A1 | 10/2002 | Prasad et al. |
| 2003/0039601 A1 | 2/2003 | Halvorson et al. |
| 2003/0039608 A1 | 2/2003 | Shah et al. |
| 2003/0054154 A1 | 3/2003 | Chen et al. |
| 2003/0068260 A1 | 4/2003 | Wellington et al. |
| 2003/0230196 A1 | 12/2003 | Kim |
| 2004/0042944 A1 | 3/2004 | Sehlin et al. |
| 2004/0043272 A1* | 3/2004 | Gorte ............... H01M 4/8621 429/489 |
| 2004/0065541 A1 | 4/2004 | Sehlin |
| 2004/0089973 A1 | 5/2004 | Hoang |
| 2004/0221722 A1 | 11/2004 | Prasad et al. |
| 2005/0037299 A1 | 2/2005 | Gottzmann |
| 2005/0058871 A1 | 3/2005 | Li et al. |
| 2005/0061663 A1 | 3/2005 | Chen et al. |
| 2005/0137810 A1 | 6/2005 | Esposito |
| 2005/0214612 A1 | 9/2005 | Visco et al. |
| 2005/0248098 A1 | 11/2005 | Sisk et al. |
| 2005/0263405 A1 | 12/2005 | Jacobson et al. |
| 2006/0029539 A1 | 2/2006 | Dutta et al. |
| 2006/0054301 A1 | 3/2006 | McRay et al. |
| 2006/0062707 A1 | 3/2006 | Crome et al. |
| 2006/0127656 A1* | 6/2006 | Gallo ............... B01D 53/228 428/212 |
| 2006/0127749 A1 | 6/2006 | Christie et al. |
| 2006/0191408 A1 | 8/2006 | Gopalan et al. |
| 2006/0236719 A1 | 10/2006 | Lane et al. |
| 2007/0004809 A1 | 1/2007 | Lattner et al. |
| 2007/0029342 A1 | 2/2007 | Cross et al. |
| 2007/0039466 A1 | 2/2007 | Nawata et al. |
| 2007/0041894 A1 | 2/2007 | Drnevich |
| 2007/0065687 A1 | 3/2007 | Kelly et al. |
| 2007/0082254 A1 | 4/2007 | Hiwatashi |
| 2007/0104793 A1 | 5/2007 | Akash |
| 2007/0137478 A1 | 6/2007 | Stein et al. |
| 2007/0158329 A1 | 7/2007 | Cao |
| 2007/0163889 A1 | 7/2007 | Kato et al. |
| 2007/0212271 A1 | 9/2007 | Kennedy et al. |
| 2007/0289215 A1 | 12/2007 | Hemmings et al. |
| 2007/0292342 A1 | 12/2007 | Hemmings et al. |
| 2007/0292742 A1 | 12/2007 | Ball et al. |
| 2008/0000350 A1 | 1/2008 | Mundschau et al. |
| 2008/0000353 A1 | 1/2008 | Rarig et al. |
| 2008/0006532 A1 | 1/2008 | Mukundan et al. |
| 2008/0023338 A1 | 1/2008 | Stoots et al. |
| 2008/0029388 A1 | 2/2008 | Elangovan et al. |
| 2008/0047431 A1* | 2/2008 | Nagabhushana .... B01D 53/228 96/11 |
| 2008/0141672 A1 | 6/2008 | Shah et al. |
| 2008/0168901 A1 | 7/2008 | Carolan et al. |
| 2008/0169449 A1 | 7/2008 | Mundschau |
| 2008/0226544 A1 | 9/2008 | Nakamura |
| 2008/0302013 A1 | 12/2008 | Repasky et al. |
| 2009/0001727 A1 | 1/2009 | De Koeijer et al. |
| 2009/0023050 A1 | 1/2009 | Finnerty et al. |
| 2009/0029040 A1 | 1/2009 | Christie et al. |
| 2009/0031895 A1 | 2/2009 | Del-Gallo et al. |
| 2009/0084035 A1 | 4/2009 | Wei |
| 2009/0107046 A1 | 4/2009 | Leininger |
| 2009/0120379 A1 | 5/2009 | Bozzuto et al. |
| 2009/0220837 A1* | 9/2009 | Osada ............... H01M 4/8885 429/421 |
| 2010/0015014 A1 | 1/2010 | Gopalan et al. |
| 2010/0074828 A1 | 3/2010 | Singh |
| 2010/0076280 A1 | 3/2010 | Bernstein et al. |
| 2010/0116133 A1 | 5/2010 | Reed et al. |
| 2010/0116680 A1 | 5/2010 | Reed et al. |
| 2010/0122552 A1 | 5/2010 | Schwartz |
| 2010/0143824 A1 | 6/2010 | Tucker et al. |
| 2010/0178219 A1 | 7/2010 | Verykios et al. |
| 2010/0178238 A1 | 7/2010 | Takamura et al. |
| 2010/0193104 A1 | 8/2010 | Ryu et al. |
| 2010/0200418 A1 | 8/2010 | Licht |
| 2010/0266466 A1 | 10/2010 | Froehlich et al. |
| 2010/0276119 A1 | 11/2010 | Doty |
| 2010/0313762 A1 | 12/2010 | Roeck et al. |
| 2011/0067405 A1 | 3/2011 | Armstrong et al. |
| 2011/0076213 A1 | 3/2011 | Carolan et al. |
| 2011/0111320 A1 | 5/2011 | Suda et al. |
| 2011/0120127 A1 | 5/2011 | Lippmann et al. |
| 2011/0132367 A1 | 6/2011 | Patel |
| 2011/0142722 A1 | 6/2011 | Hemmings et al. |
| 2011/0143255 A1 | 6/2011 | Jain et al. |
| 2011/0180399 A1 | 7/2011 | Christie et al. |
| 2011/0200520 A1 | 8/2011 | Ramkumar |
| 2011/0240924 A1 | 10/2011 | Repasky |
| 2011/0253551 A1 | 10/2011 | Lane et al. |
| 2012/0000360 A1 | 1/2012 | Richet et al. |
| 2012/0067060 A1 | 3/2012 | Greeff |
| 2012/0288439 A1 | 11/2012 | Sundaram et al. |
| 2012/0294783 A1 | 11/2012 | Palamara et al. |
| 2013/0009100 A1 | 1/2013 | Kelly et al. |
| 2013/0009102 A1 | 1/2013 | Kelly et al. |

(56) References Cited

U.S. PATENT DOCUMENTS

| | | |
|---|---|---|
| 2013/0015405 A1 | 1/2013 | Quintero |
| 2013/0072374 A1 | 3/2013 | Lane et al. |
| 2013/0072375 A1 | 3/2013 | Lane et al. |
| 2013/0156958 A1 | 6/2013 | Belov et al. |
| 2014/0044604 A1 | 2/2014 | Lane et al. |
| 2014/0056774 A1 | 2/2014 | Kelly et al. |
| 2014/0060643 A1 | 3/2014 | Martin et al. |
| 2014/0183866 A1 | 7/2014 | Kromer et al. |
| 2014/0206779 A1 | 7/2014 | Lackner |
| 2014/0319424 A1 | 10/2014 | Chakravarti et al. |
| 2014/0319427 A1 | 10/2014 | Chakravarti et al. |
| 2014/0323597 A1 | 10/2014 | Stuckert et al. |
| 2014/0323598 A1 | 10/2014 | Chakravarti et al. |
| 2014/0323599 A1 | 10/2014 | Chakravarti et al. |
| 2015/0098872 A1 | 4/2015 | Kelly et al. |
| 2015/0328582 A1 | 11/2015 | Joo et al. |

FOREIGN PATENT DOCUMENTS

| | | |
|---|---|---|
| EP | 0926096 A1 | 6/1999 |
| EP | 0984500 A2 | 3/2000 |
| EP | 0989093 A2 | 3/2000 |
| EP | 1504811 A1 | 2/2005 |
| EP | 1717420 A1 | 11/2006 |
| EP | 1743694 A1 | 1/2007 |
| EP | 2873451 A1 | 5/2015 |
| GB | 688657 | 3/1953 |
| GB | 689522 | 4/1953 |
| GB | 697377 | 9/1953 |
| GB | 713553 | 11/1954 |
| GB | 1199483 | 7/1970 |
| GB | 1348375 | 3/1974 |
| JP | 56-136605 | 10/1981 |
| WO | WO 9842636 | 10/1998 |
| WO | WO 0017418 | 3/2000 |
| WO | WO 0109059 A1 | 2/2001 |
| WO | WO 2007060141 | 5/2007 |
| WO | WO 2007/086949 A2 | 8/2007 |
| WO | WO 2008/024405 A2 | 2/2008 |
| WO | WO 2010052641 A2 | 5/2010 |
| WO | WO 2011083333 A1 | 7/2011 |
| WO | WO 2011121095 A2 | 10/2011 |
| WO | WO 2012118730 | 9/2012 |
| WO | WO 2013009560 A1 | 1/2013 |
| WO | WO 2013062413 A1 | 5/2013 |
| WO | WO 2013089895 A1 | 6/2013 |
| WO | WO 2014074559 A1 | 5/2014 |
| WO | WO 2014077531 A1 | 5/2014 |
| WO | WO 2014107707 A2 | 7/2014 |
| WO | WO 2014176022 A1 | 10/2014 |

OTHER PUBLICATIONS

Switzer et al., "Cost and Feasibility Study on the Praxair Advanced Boiler for the CO2 Capture Project's Refinery Scenario", Carbon Dioxide Capture for Deep Geologic Formations—Results, vol. 1, D.C. Thomas and S.M. Benson (Eds.), Copyright 2005 Published by Elsevier Ltd., Chapter 32, pp. 561-579.

David Studer; Demonstration of a cylinder fill system based on solid electrolyte oxygen separator (SEOS) technology: Early field assessment at a USAF maintenance facility, (Air Products & Chemicals Inc.); AFRL-RH-BR-TR-2010-0046; Jun. 2010.

Zhu et al.; Development of Interconnect Materials for Solid Oxide Fuel Cells; Materials Science and Engineering A348, Apr. 23, 2002, pp. 227-243.

Lee Rosen et al.; "Development of Oxygen Transport Membranes for Coal-Based Power Generation"; ScienceDirect (Available online at www.sciencedirect.com); Energy Procedia 4 (2011) pp. 750-755.

F. Bidrawn et al., "Efficient Reduction of C02 in a Solid Oxide Electrolyzer" Electrochemical and Solid State Letters, vol. 11, No. 9, Jun. 20, 2008, pp. B167-B170, XP002644615.

Ebbesen et al., "Electrolysis of carbon dioxide in Solid Oxide Electrolysis Cells", Journal of Power Sources, Elsevier SA, CH, vol. 193, No. 1, Aug. 1, 2009, pp. 349-358, XP026150424, ISSN: 0378-7753, DOI: 10.1016/J. JPOWSOUR. 2009. 02. 093.

The U.S. Department of Energy, "Evaluation of Fossil Fuel Power Plants with C02 Recovery", Final Report (2002).

U.S. Department of Energy—Office of Fossil Energy and U.S. Department of Energy/NETL, "Evaluation of innovative Fossil Fuel Power Plants with C02 Removal", Interim Report Dec. 2000.

Neville Holt, "Gasification Process Selection—Trade-offs and Ironies", Presented at the Gasification Technologies Conference 2004, Oct. 3-6, 2004 JW Marriott Hotel, Washington, DC, pp. 1-10.

Friedemann Marschner et al., "Gas Production", Ullmann's Encyclopedia of Industrial Chemistry, Jun. 15, 2000, pp. 1-21, XP002253967.

Dyer et al., "Ion Transport Membrane Technology for Oxygen Separation and Syngas Production", Solid State Ionics 134 (2000) p. 21-33.

Andrea Montebelli et al., "Methods for the catalytic activation of metallic structured substrates", Catalysis Science & Technology, 2014, pp. 2846-2870.

Joseph J. Beaman, D.Sc.; "Oxygen Storage on Zeolites"; Prepared by USAF School of Aerospace Medicine, Human Systems Divisions (AFSC), Brooks Air Force Base, TX 78235-5301; USAFSAM-TR-88-26; AD-A209 352; pp. 1-77; Jan. 1989.

Radtke et al., "Renaissance of Gasification based on Cutting Edge Technologies", VGB PowerTech (2005), XP-001235150 pp. 106-115.

L. N. Protasova et al., "Review of Patent Publications from 1990 to 2010 on Catalytic Coatings on Different Substrates, Including Microstructured Channels: Preparation, Deposition Techniques, Applications", Recent Patents on Chemical Engineering, 2012, pp. 28-44.

Zhimin Zhong, "Stoichiometric lanthanum chromite based ceramic interconnects with low sintering temperature", Solid State of Ionics, North Holland Pub. Company, Amsterdam, NL, vol. 177 No. 7-8, Mar. 15, 2006, pp. 757-764, XP027895768,ISSN: 0167-2738.

Babcock & Wilcox, Steam 40, "Sulfur Dioxide Control" (1992), pp. 35-1-35-15.

M.F. Lu et al., Thermomechanical transport and anodic properties of perovskite-type (LaSr) CrFeO, Journal of Power Sources, Elsevier SA, CH, vol. 206, Jan. 15, 2012, pp. 59-69, XP028403091.

Okawa et al., Trial Design for a C02 Recovery Power Plant by Burning Pulverized Coal in 02/C02., Energy Conyers. Mgmt., vol. 38, Supplement (1997) pp. S123-S127.

Ciacchi et al., "Tubular zirconia-yttria electrolyte membrane technology for oxygen separation", Solid State Ionics 152-153, 2002, pp. 763-768.

\* cited by examiner

CATALYST CONTAINING OXYGEN TRANSPORT MEMBRANE

CROSS REFERENCE TO RELATED APPLICATIONS

The present application is a continuation-in part application of U.S. patent application Ser. No. 12/968,699; filed Dec. 15, 2010, which is incorporated by reference herein in its entirety.

U.S. GOVERNMENT RIGHTS

The invention disclosed and claimed herein was made with United States Government support under Cooperative Agreement number DE-FC26-07NT43088 awarded by the U.S. Department of Energy. The United States Government has certain rights in this invention.

FIELD OF THE INVENTION

The present invention relates to a composite oxygen transport membrane in which catalyst particles, selected to promote oxidation of a combustible substance, are located within an intermediate porous layer that is in turn located between a dense layer and a porous support layer and within the porous support and a method of applying the catalyst to the intermediate porous layer and the porous support layer through wicking of catalyst precursors through the porous support layer to the intermediate porous layer.

BACKGROUND

Oxygen transport membranes function by transporting oxygen ions through a material that is capable of conducting oxygen ions and electrons at elevated temperatures. Such materials can be mixed conducting in that they conduct both oxygen ions and electrons or a mixture of materials that include an ionic conductor capable of primarily conducting oxygen ions and an electronic conductor with the primary function of transporting the electrons. Typical mixed conductors are formed from doped perovskite structured materials. In case of a mixture of materials, the ionic conductor can be yttrium or scandium stabilized zirconia and the electronic conductor can be a perovskite structured material that will transport electrons, a metal or metal alloy or a mixture of the perovskite type material, the metal or metal alloy.

When a partial pressure difference of oxygen is applied on opposite sides of such a membrane, oxygen ions will ionize on one surface of the membrane and emerge on the opposite side of the membrane and recombine into elemental oxygen. The free electrons resulting from the combination will be transported back through the membrane to ionize the oxygen. The partial pressure difference can be produced by providing the oxygen containing feed to the membrane at a positive pressure or by supplying a combustible substance to the side of the membrane opposing the oxygen containing feed or a combination of the two methods.

Typically, oxygen transport membranes are composite structures that include a dense layer composed of the mixed conductor or the two phases of materials and one or more porous supporting layers. Since the resistance to oxygen ion transport is dependent on the thickness of the membrane, the dense layer is made as thin as possible and therefore must be supported. Another limiting factor to the performance of an oxygen transport membrane concerns the supporting layers that, although can be active, that is oxygen ion or electron conducting, the layers themselves can consist of a network of interconnected pores that can limit diffusion of the oxygen or fuel or other substance through the membrane to react with the oxygen. Therefore, such support layers are typically fabricated with a graded porosity in which the pore size decreases in a direction taken towards the dense layer or are made highly porous throughout. The high porosity, however, tends to weaken such a structure.

U.S. Pat. No. 7,229,537 attempts to solve such problems by providing a support with cylindrical or conical pores that are not connected and an intermediate porous layer located between the dense layer and the support that distributes the oxygen to the pores within the support. Porous supports can also be made by freeze casting techniques, as described in 10, No. 3, Advanced Engineering Materials, "Freeze-Casting of Porous Ceramics: A Review of Current Achievements and Issues" (2008) by Deville, pp. 155-169. In freeze casting, a liquid suspension is frozen. The frozen liquid phase is then sublimated from a solid to a vapor under reduced pressure. The resulting structure is sintered to consolidate and densify the structure. This leads to a porous structure having pores extending in one direction and that have a low toruosity. Such supports have been used to form electrode layers in solid oxide fuel cells. In addition to the porous support layers, a porous surface exchange layer can be located on the opposite side of the dense layer to enhance reduction of the oxygen into oxygen ions. Such a composite membrane is illustrated in U.S. Pat. No. 7,556,676 that utilizes two phase materials for the dense layer, the porous surface exchange layer and the intermediate porous layer. These layers are supported on a porous support that can be formed of zirconia.

As mentioned above, the oxygen partial pressure difference can be created by combusting a fuel or other combustible substance with the separated oxygen. The resulting heat will heat the oxygen transport membrane up to operational temperature and excess heat can be used for other purposes, for example, heating a fluid, for example, raising steam in a boiler or in the combustible substance itself While perovskite structured materials will exhibit a high oxygen flux, such materials tend to be very fragile under operational conditions such as in the heating of a fluid. This is because the perovskite type materials will have a variable stoichiometry with respect to oxygen. In air it will have one value and in the presence of a fuel that is undergoing combustion it will have another value. The end result is that at the fuel side, the material will tend to expand relative to the air side and a dense layer will therefore, tend to fracture. In order to overcome this problem, a mixture of materials can be used in which an ionic conductor is provided to conduct the oxygen ions and an electronic conductor is used to conduct the electrons. Where the ionic conductor is a fluorite structured material, this chemical expansion is restrained, and therefore the membrane will be less susceptible to structural failure. However, the problem with the use of a fluorite structure material, such as a stabilized zirconia, is that such a material has lower oxygen ion conductivity. As a result, far more oxygen transport membrane elements are required for such a dual phase type of membrane as compared with one that is formed from a single phase perovskite type material.

As will be discussed, the present invention provides a robust oxygen transport membrane that utilizes a material having a fluorite structure as an ionic conductor and that incorporates a deposit of a catalyst in an intermediate porous layer located between a dense layer and a porous support to promote oxidation of the combustible substance and thereby increase the oxygen flux that would otherwise have been obtained with the use of a fluorite structured material as an ionic conductor.

SUMMARY OF THE INVENTION

The present invention may be characterized as a composite oxygen transport membrane comprising (i) a porous support layer comprised of an fluorite structured ionic conducting material having a porosity of greater than 20 percent and a microstructure exhibiting substantially uniform pore size distribution throughout the porous support layer; (ii) an intermediate porous layer often referred to as a fuel oxidation layer disposed adjacent to the porous support layer and capable of conducting oxygen ions and electrons to separate oxygen from an oxygen containing feed and comprising a mixture of a fluorite structured ionic conductive material and electrically conductive materials to conduct the oxygen ions and electrons, respectively; (iii) a dense separation layer capable of conducting oxygen ions and electrons to separate oxygen from an oxygen containing feed, the dense layer adjacent to the intermediate porous layer and also comprising a mixture of a fluorite structured ionic conductive material and electrically conductive materials to conduct the oxygen ions and electrons, respectively; and (iv) catalyst particles or a solution containing precursors of the catalyst particles located in pores of the porous support layer and intermediate porous layer, the catalyst particles containing a catalyst selected to promote oxidation of a combustible substance in the presence of the separated oxygen transported through the dense layer and the intermediate porous layer to the porous support layer. The catalyst is preferably gadolinium doped ceria but may also be other catalysts that promote fuel oxidation. The composite oxygen transport membrane may also include a porous surface exchange layer or an air activation layer disposed or applied to the dense separation layer on the side opposite to the intermediate porous layer or the fuel oxidation layer. If used, the porous surface exchange layer or an air activation layer preferably has a thickness of between 10 and 40 microns and a porosity of between about 30 and 60 percent.

The intermediate porous layer or fuel oxidation layer preferably has a thickness of between about 10 and 40 microns and a porosity of between about 20 and 50 percent whereas the dense layer has a thickness of between 10 and 50 microns. The porous support layer may be formed from a mixture comprising 3 mol % yttria stabilized zirconia, or 3YSZ and a polymethyl methacrylate based pore forming material or a mixture comprising 3YSZ having a bi-modal or multimodal particle size distribution. In either embodiment, the porous support layer has a preferred thickness of between about 0.5 and 4 mm and porosity between about 20 and 40 percent.

Broadly characterizing the preferred embodiments of the composite oxygen transport membrane, the intermediate porous layer comprises a mixture of about 60 percent by weight of $(La_uSr_vCe_{1-u-v})_wCr_xM_yV_zO_{3-\delta}$ with the remainder $Zr_xSc_{y'}A_{z'}O_{2-\delta}$. Similarly, the dense separation layer comprises a mixture of about 40 percent by weight of $(La_uSr_vCe_{1-u-v}Cr_xM_yV_zO_{3-\delta}$ with the remainder $Zr_xSc_{y'}A_{z'}O_{2-\delta}$. In the above formulations, u is from 0.7 to 0.9, v is from 0.1 to 0.3 and (1-u-v) is greater than or equal to zero, w is from 0.94 to 1, x is from 0.5 to 0.77, M is Mn or Fe, y is from 0.2 to 0.5, z is from 0 to 0.03, and x+y+z=1, where y' is from 0.08 to 0.3, z' is from 0.01 to 0.03, x'+y'z'=1 and A is Y or Ce or mixtures of Y and Ce. The porous surface exchange layer or air activation layer, if employed, can be is formed by a mixture of about 50 percent by weight of $(La_{x'''}Sr_{1-x'''})_{y'''}MO_{3-\delta}$, where x''' is from 0.2 to 0.9, y''' is from 0.95 to 1, M is Mn or Fe, with the remainder $Zr_x^{iv}Sc_{y'}^{iv}A_z^{iv}O_{2-\delta}$, where $y^{iv}$ is from 0.08 to 0.3, $z^{iv}$ is from 0.01 to 0.03, $x^{iv}+y^{iv}+z^{iv}=1$ and A is Y, Ce or mixtures thereof.

More specifically, one of the preferred embodiments of the composite oxygen transport membrane includes an intermediate porous layer or fuel oxidation layer that comprises about 60 percent by weight of $(La_{0.825}Sr_{0.175})_{0.96}Cr_{0.76}Fe_{0.225}V_{0.015}O_{3-\delta}$ or $(La_{0.8}Sr_{0.2})_{0.95}Cr_{0.7}Fe_{0.3}O_{3-\delta}$ with the remainder 10Sc1YSZ or 10Sc1CeSZ. Similarly, the dense separation layer comprises about 40 percent by weight of $(La_{0.825}Sr_{0.175})_{0.94}Cr_{0.72}Mn_{0.26}V_{0.02}O_{3-\delta}$ or $(La_{0.8}Sr_{0.2})_{0.95}Cr_{0.5}Fe_{0.5}O_{3-\delta}$, with the remainder 10Sc1YSZ or 10Sc1CeYSZ. The porous surface exchange layer or air activation layer is formed by a mixture of about 50 percent by weight of $(La_{0.8}Sr_{0.2})_{0.98}MnO_{3-\delta}$ or $La_{0.8}Sr_{0.2}FeO_{3-\delta}$, remainder 10Sc1YSZ or 10Sc1CeSZ.

The present invention may also be characterized as a product by process wherein the product is a composite oxygen transport membrane. The process comprises: (i) fabricating a porous support layer comprised of an fluorite structured ionic conducting material, the fabricating step including pore forming enhancement step such that the porous support layer has a porosity of greater than about 20 percent and a microstructure exhibiting substantially uniform pore size distribution throughout the porous support layer; (ii) applying an intermediate porous layer or fuel oxidation layer on the porous support layer, (iii) applying a dense separation layer on the intermediate porous layer; and (iv) introducing catalyst particles or a solution containing precursors of the catalyst particles to the porous support layer and intermediate porous layer, the catalyst particles containing a catalyst selected to promote oxidation of a combustible substance in the presence of the separated oxygen transported through the dense layer and the intermediate porous layer to the porous support layer.

Both the intermediate porous layer and dense separation layer are capable of conducting oxygen ions and electrons to separate oxygen from an oxygen containing feed. Both layers comprise a mixture of a fluorite structured ionic conductive material and electrically conductive materials to conduct the oxygen ions and electrons, respectively.

The pore forming enhancement process involves several alternative techniques including mixing a polymethyl methacrylate based pore forming material with the fluorite structured ionic conducting material of the porous support layer. In addition or alternatively, the pore forming enhancement process may further involve use of bi-modal or multi-modal particle sizes of the polymethyl methacrylate based pore forming material and/or the fluorite structured ionic conducting material of the porous support layer.

The step of introducing catalyst particles or a solution containing precursors of the catalyst particles to the porous support layer and intermediate porous layer may further comprise either: (a) adding catalyst particles directly to the mixture of materials used in the intermediate porous layer; or (b) applying a solution containing catalyst precursors to the porous support layer on a side thereof opposite to the intermediate porous layer so that the solution infiltrates or impregnates the pores within the porous support layer and the intermediate porous layer with the solution containing catalyst precursors and heating the composite oxygen transport membrane after the solution containing catalyst precursors infiltrates the pores and to form the catalyst from the catalyst precursors.

Finally, the present invention may also be characterized as a method of producing a catalyst containing composite oxygen transport membrane comprising the steps of: (i) forming a composite oxygen transport membrane in a sintered state, said composite oxygen transport membrane having a plurality of layers comprising a dense separation layer, a porous support layer, and an intermediate porous layer (i.e. fuel oxidation layer) located between the dense separation layer and the porous support layer; (ii) applying a solution containing catalyst precursors to the porous support layer on a side thereof opposite to the intermediate porous layer, the catalyst precursors selected to produce a catalyst capable of promoting oxidation of the combustible substance in the presence of the separated oxygen; (iii) infiltrating or impregnating the porous support layer with the solution so that the solution wicks through the pores of the porous support layer and at least partially infiltrates or impregnates the intermediate porous layer (i.e. fuel oxidation layer), and (iv) heating the composite oxygen transport membrane after infiltrating the pores within the porous support layer and the intermediate porous layer such that the catalyst is formed from the catalyst precursors. Preferably, the catalyst is gadolinium doped ceria and the solution is an aqueous metal ion solution containing about 20 mol % $Gd(NO_3)_3$ and 80 mol % $Ce(NO_3)_3$ that when sintered forms $Gd_{0.8}Ce_{0.2}O_{2-\delta}$.

Each of the dense layer and the intermediate porous layer capable of conducting oxygen ions and electrons at an elevated operational temperature to separate oxygen from an oxygen containing feed. The dense layer and the intermediate porous layer comprising mixtures of a fluorite structured ionic conductive material and electrically conductive materials to conduct oxygen ions and electrons, respectively.

The porous support layer comprising a fluorite structured ionic conducting material having a porosity of greater than about 20 percent and a microstructure exhibiting substantially uniform pore size distribution throughout the porous support layer. Pores are formed within the porous support layer using a polymethyl methacrylate based pore forming material mixed with the 3YSZ material of the porous support layer. In addition or alternatively, the pores may be formed using bi-modal or multi-modal particle sizes of the polymethyl methacrylate based pore forming material and/or the 3YSZ material of the porous support layer.

To aid in the infiltration or impregnation process, a pressure may be established on the second side of the porous support layer or the pores of the porous support layer and fuel oxidation layer may first be evacuated of air using a vacuum to further assist in wicking of the solution and prevent the opportunity of trapped air in the pores preventing wicking of the solution all the way through the support structure to the intermediate layer.

BRIEF DESCRIPTION OF THE DRAWINGS

While the specification concludes with claims distinctly pointing out the subject matter that Applicants regard as their invention, it is believed that the invention will be better understood when taken in connection with the accompanying drawings in which:

DETAILED DESCRIPTION

Figure 1:
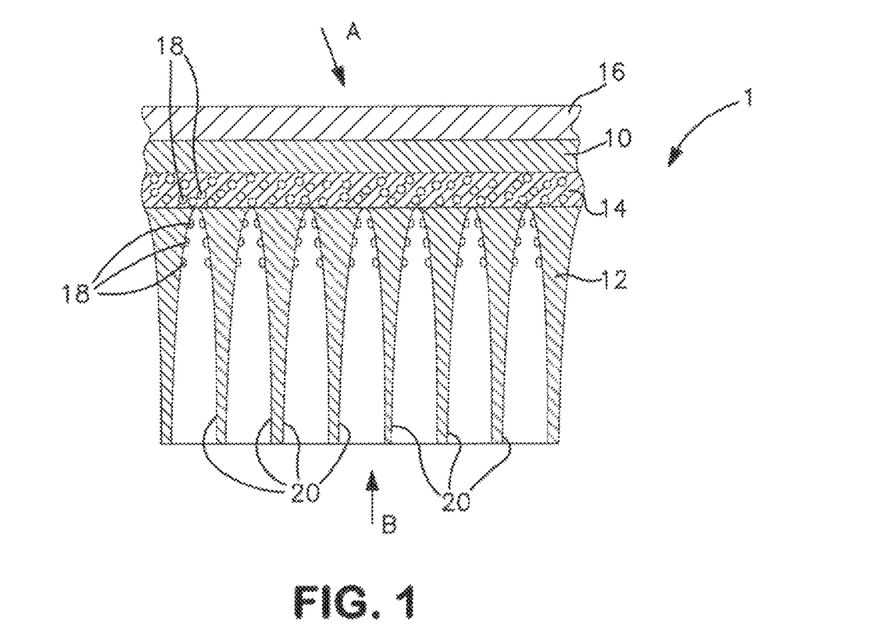
FIG. 1 is a cross-sectional schematic view of a composite oxygen transport membrane element of the present invention that is fabricated in accordance with a method of the present invention.

With reference to FIG. 1, a sectional view of a composite oxygen transport membrane element 1 in accordance with the present invention is illustrated. As could be appreciated by those skilled in the art, such composite oxygen transport membrane element 1 could be in the form of a tube or a flat plate. Such composite oxygen transport membrane element 1 would be one of a series of such elements situated within a device to heat a fluid such as in a boiler or other reactor having such a heating requirement.

Composite oxygen transport membrane element 1 is provided with a dense layer 10, a porous support layer 12 and an intermediate porous layer 14 located between the dense layer 10 and the porous support layer 12. A preferable option is, as illustrated, to also include a porous surface exchange layer 16 in contact with the dense layer 10, opposite to the intermediate porous layer 14. Catalyst particles 18 are located in the intermediate porous layer 14 that are formed of a catalyst selected to promote oxidation of a combustible substance in the presence of oxygen separated by the composite membrane element 1. It is to be noted that the term "combustible substance" as used herein and in the claims means any substance that is capable of being oxidized, including, but not limited, to a fuel in case of a boiler, a hydrocarbon containing substance for purposes of oxidizing such substance for producing a hydrogen and carbon monoxide containing synthesis gas or the synthesis gas itself for purposes of supplying heat to, for example, a reformer. As such the term, "oxidizing" as used herein and in the claims encompasses both partial and full oxidation of the substance.

Operationally, air or other oxygen containing fluid is contacted on one side of the composite oxygen transport membrane element 1 and more specifically, against the porous surface exchange layer 16 in the direction of arrowhead "A". The porous surface exchange layer 16 is porous and is capable of mixed conduction of oxygen ions and electrons and functions to ionize some of the oxygen. The oxygen that is not ionized at and within the porous surface exchange layer 16, similarly, also ionizes at the adjacent surface of the dense layer 10 which is also capable of such mixed conduction of oxygen ions and electrons. The oxygen ions are transported through the dense layer 10 to intermediate porous layer 14 to be distributed to pores 20 of the porous support layer 12. It should be noted that in FIGS. 1-3, the pores 20 within the porous support layer 12 are shown in an exaggerated manner. Some of the oxygen ions, upon passage through the dense layer will recombine into elemental oxygen. The recombination of the oxygen ions into elemental oxygen is accompanied by the loss of electrons that flow back through the dense layer to ionize the oxygen at the opposite surface thereof.

At the same time, a combustible substance, for example a hydrogen and carbon monoxide containing synthesis gas, is contacted on one side of the porous support layer 12 located opposite to the intermediate porous layer 14 as indicated by arrowhead "B". The combustible substance enters pores 20, contacts the oxygen and burns through combustion supported by oxygen. The combustion is promoted by the catalyst that is present by way of catalyst particles 18.

The presence of combustible fuel on the side of the composite oxygen ion transport membrane element 1, specifically the side of the dense layer 10 located adjacent to the intermediate porous layer 14 provides a lower partial pressure of oxygen. This lower partial pressure drives the oxygen ion transport as discussed above and also generates heat to heat the dense layer 10, the intermediate porous layer 14 and the porous surface exchange layer 16 up to an operational temperature at which the oxygen ions will be conducted. In specific applications, the incoming oxygen containing stream can also be pressurized to enhance the oxygen partial pressure difference between opposite sides of the composite oxygen ion transport membrane element 1. Excess heat that is generated by combustion of the combustible substance will be used in the specific application, for example, the heating of water into steam within a boiler or to meet the heating requirements for other endothermic reactions.

Figure 2:
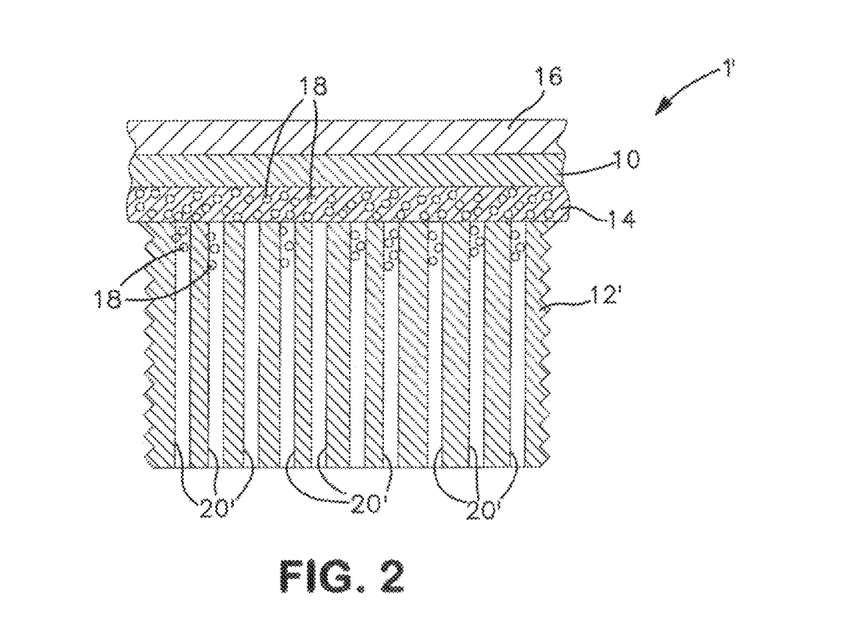
FIG. 2 is an alternative embodiment of FIG. 1.
Figure 3:
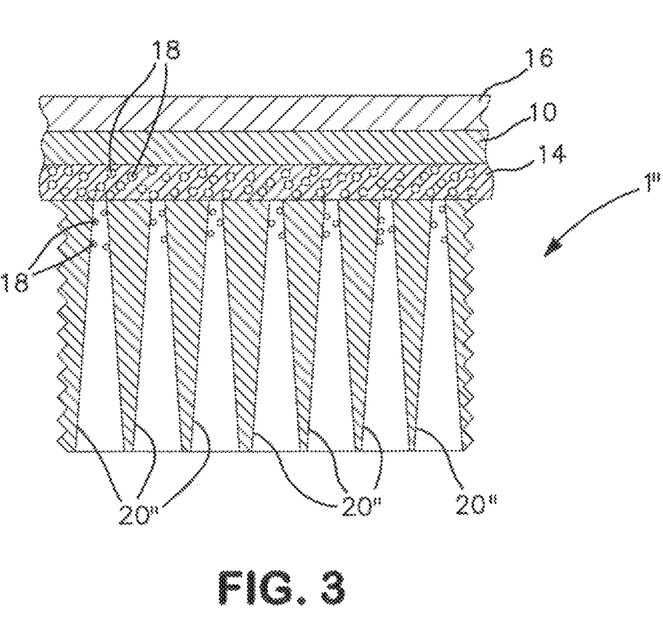
FIG. 3 is an alternative embodiment of FIG. 1.

In the embodiments described with reference to FIGS. 1-3, the use of a single phase mixed conducting material such as a perovskite structured materials has the disadvantage of exhibiting chemical expansion, or in other words, one side of a layer, at which the oxygen ions recombine into elemental oxygen, will expand relative to the opposite side thereof This resulting stress can cause failure of such a layer or separation of the layer from adjacent layers. In order to avoid this, the dense layer, the intermediate porous layer, and the porous surface exchange layer were all formed of a two phase system comprising a fluorite structured material in one phase as the ionic conductor of the oxygen ions and an electronic conducting phase that in the illustrated embodiment is a perovskite type material. In the described embodiments, the porous support layer 12, 12', 12" have a thickness of between about 0.5 mm and about 4.0 mm, and more preferably about 1.0 mm and are preferably formed of a fluorite structured material only with a PMMA based pore former material. As such, the porous support layers 12; 12' and 12" preferably do not exhibit significant mixed conduction. The material used in forming the porous support layer preferably have a thermal expansion coefficient in the range $9 \times 10^{-6}$ cm/cm×K$^{-1}$ and $12 \times 10^{-6}$ cm/cm×K$^{-1}$ in the temperature range of 20° C. to 1000° C.; where "K" is the temperature in Kelvin.

As discussed above, dense layers 10, 10', 10" or dense separation layers function to separate oxygen from an oxygen containing feed exposed to one surface of the oxygen ion transport membrane 10 and contains an electronic and ionic conducting phases. The dense separation layer also serves as a barrier of sorts to prevent mixing of the fuel on one side of the membrane with the air or oxygen containing feed stream on the other side of the membrane. As discussed above, the electronic phase in the dense layer is $(La_uSr_vCe_{1-u-v})_wCr_xM_yV_zO_{3-\delta}$ where u is from about 0.7 to about 0.9, v is from about 0.1 to about 0.3 and (1-u-v) is greater than or equal to zero, w is from about 0.94 to about 1, x is from about 0.5 to about 0.77, M is Mn or Fe, y is from about 0.2 to about 0.5, z is from about 0 to about 0.03, and x+y+z=1 ("LSCMV"). The ionic phase is $Zr_{x'}Sc_{y'}A_{z'}O_{2-\delta}$ ("YScZ"), where y' is from about 0.08 to about 0.3, z' is from about 0.01 to about 0.03, x'+y'+z'=1 and A is Y or Ce or mixtures of Y and Ce. The variable "δ" as used in the formulas set forth below for the indicated substances, as would be known in the art would have a value that would render such substances charge neutral. It is to be noted, that since the quantity (1-u-v) can be equal to zero, cerium may not be present within an electronic phase of the present invention. Preferably, the dense separation layer contains a mixture of 40 percent by weight $(La_{0.8}Sr_{0.2})_{0.95}Cr_{0.5}Fe_{0.5}O_{3-\delta}$, remainder 10Sc1CeYSZ; or alternatively about 40 percent by weight of $(La_{0.825}Sr_{0.175})_{0.94}Cr_{0.72}Mn_{0.26}V_{0.02}O_{3-\delta}$, remainder 10Sc1YSZ. As also mentioned above, in order to reduce the resistance to oxygen ion transport, the dense layer should be made as thin as possible and in the described embodiment has a thickness of between about 10 microns and about 50 microns.

Porous surface exchange layers 16, 16', 16" or air activation layers are designed to enhance the surface exchange rate by enhancing the surface area of the dense layers 10, 10', 10" while providing a path for the resulting oxygen ions to diffuse through the mixed conducting oxide phase to the dense layer and for oxygen molecules to diffuse through the open pore spaces to the same. The porous surface exchange layer 16, 16', 16" therefore, reduces the loss of driving force in the surface exchange process and thereby increases the achievable oxygen flux. As indicated above, it also can be a two-phase mixture containing an electronic conductor composed of $(La_{x'''}Sr_{1-x'''})_{y'''}MO_{3-\delta}$, where x''' is from about 0.2 to about 0.9, y''' is from about 0.95 to 1, M is Mn or Fe; and an ionic conductor composed of $Zr_{x^{iv}}Sc_{y^{iv}}A_{z^{iv}}O_{2-\delta}$, where $y^{iv}$ is from about 0.08 to about 0.3, $z^{iv}$ is from about 0.01 to about 0.03, $x^{iv}+y^{iv}+z^{iv}=1$ and A is Y, Ce or mixtures of Y and Ce. In the described embodiments, porous surface exchange layer is formed of a mixture of about 50 percent by weight of $(La_{0.8}Sr_{0.2})_{0.98}MnO_{3-\delta}$, remainder 10Sc1YSZ. The porous surface exchange layer is a porous layer and preferably has a thickness of between about 10 microns and about 40 microns, a porosity of between about 30 percent and about 60 percent and an average pore diameter of between about 1 microns and about 4 microns.

The intermediate porous layer 14, 14', 14" is a fuel oxidation layer and is a preferably formed of the same mixture as the dense layer 10, 10', 10" and preferably has an applied thickness of between about 10 microns and about 40 microns, a porosity of between about 25 percent and about 40 percent and an average pore diameter of between about 0.5 microns and about 3 microns.

In addition, incorporated within the intermediate porous layer 14, 14', 14" are catalyst particles 18, 18', 18". The catalyst particles 18, 18', 18" in the described embodiments are preferably gadolinium doped ceria ("CGO") that have a size of between about 0.1 and about 1 microns. Preferably, the intermediate porous layers contain a mixture of about 60 percent by weight of $(La_{0.825}Sr_{0.175})_{0.96}Cr_{0.76}Fe_{0.225}V_{0.015}O_{3-\delta}$, remainder 10Sc1YSZ. It is to be noted that intermediate porous layer as compared with the dense layer preferably may contain iron in lieu of or in place of manganese, a lower A-site deficiency, a lower transition metal (iron) content on the B-site, and a slightly lower concentration of vanadium on the B-site. It has been found that the presence of iron in the intermediate porous layer aids the combustion process and that the presence of manganese at higher concentration and a higher A-site deficiency in the dense layer improves electronic conductivity and sintering kinetics. If needed, a higher concentration of vanadium should be present in the dense layer because vanadium functions as a sintering aid, and is required to promote densification of the dense layer. Vanadium, if any, is required in lesser extent in the intermediate porous layer in order to match the shrinkage and thermal expansion characteristics with the dense layer.

The porous support layer 12, 12', 12" can be formed from a past mixture by known forming techniques including extrusion techniques and freeze casting techniques. Although pores 20, 20', 20" in the porous support layer are indicated as being a regular network of non-interconnected pores, in fact there exists some degree of connection between pores towards the intermediate porous layer. In any event, the porous network and microstructure of the porous support layer should be controlled so as to promote or optimize the diffusion of the combustible substance to the intermediate porous layer and the flow of combustion products such as steam and carbon dioxide from the pores in a direction opposite to that of arrowhead "B". The porosity of porous support layers 14, 14', 14" should preferably be greater than about 20 percent for the described embodiment as well as other possible embodiments of the present invention.

The porous support layers 12, 12', 12" are preferably fabricated from 3YSZ material commercially available from various suppliers including Tosoh Corporation and its affiliates, including Tosoh USA, with an address at 3600 Gantz Road, Grove City, Ohio. Advancements in the performance of the porous support layers have been realized when combining the Tosoh 3YSZ materials with fugitive organic pore former materials, specifically polymethyl methacrylate (PMMA). In the preferred embodiments, the porous support layer 12, 12', 12" are preferably fabricated from 67 wt % 3YSZ mixed together with 33 wt % of a PMMA based pore forming material. The pore forming material is preferably a mixture comprising 30 wt % carbon black with an average particle size less than or equal to about 1 micron combined with 70 wt % PMMA pore formers having a narrow particle size distribution and an average particle size of between about 0.8 microns and 5.0 microns Although use of the PMMA pore formers with a narrow particle size distribution have shown promising results, further pore optimization and microstructure optimization may be realized using hollow, spherical particles as well as bi-modal or multi-modal particle size distributions of either or both of the 3YSZ materials and the PMMA based pore formers. For example, bi-modal or multimodal particle size distribution of PMMA pore formers, including PMMA particles with average particle diameters of 0.8 microns, 1.5 microns 3.0 microns and 5.0 microns are contemplated.

As described in more detail below, the preferred fabrication process of the oxygen transport membrane is to form the porous support via an extrusion process and subsequently bisque firing of the extruded porous support. The porous support is then coated with the active membrane layers, including the intermediate porous layer and the dense layer, after which the coated porous support assembly is dried and fired. The coated porous support assembly is then co-sintered at a final optimized sintering temperature and conditions.

An important aspect or characteristic of the materials or combination of materials selected for the porous support is its ability to mitigate creep while providing enough strength to be used in the oxygen transport membrane applications, which can reach temperatures above 1000° C. and very high loads. It is also important to select porous support materials that when sintered will demonstrate shrinkages that match or closely approximate the shrinkage of the other layers of the oxygen transport membrane, including the dense separation layer, and intermediate porous layer.

In a preferred embodiment, the final optimized sintering temperature and conditions are selected so as to match or closely approximate the shrinkage profiles of the porous support to the shrinkage profiles of the dense separation layer while minimizing any chemical interaction between the materials of the active membrane layers, the materials in the porous support layer, and the sintering atmosphere. Too high of a final optimized sintering temperature tends to promote unwanted chemical interactions between the membrane materials, the porous support, and surrounding sintering atmosphere. Reducing atmospheres during sintering using blends of hydrogen and nitrogen gas atmosphere can be used to reduce unwanted chemical reactions but tend to be more costly techniques compared to sintering in air. Thus, an advantage to the oxygen transport membrane of the disclosed embodiments is that some may be fully sintered in air. For example, a dense separation layer comprising $(La_{0.8}Sr_{0.2})_{0.95}Cr_{0.5}Fe_{0.5}O_{3-\delta}$ and 10Sc1CeSZ appears to sinters to full density in air at about 1400° C. to 1430° C.

Figure 4:
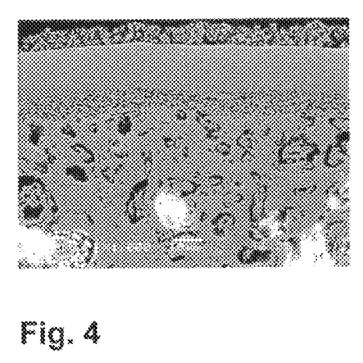
FIG. 4 is an SEM micrograph image at 1000× magnification showing a porous support layer comprised of 3YSZ with walnut shells as the pore forming material.
Figure 5:
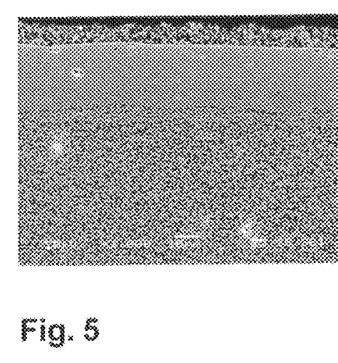
FIG. 5 is an SEM micrograph image at 1000× magnification showing a porous support layer comprised of 3YSZ with a polymethyl methacrylate (PMMA) based pore forming material in accordance with the present invention.

As shown in FIG. 5, the use of PMMA pore former produced oxygen transport membranes with both high porosity and a substantially uniform pore size distribution throughout the porous support layer. Helium leak rates were consistently lower for coated porous supports comprised of 3YSZ with PMMA based pore forming materials (i.e. as low as $4\times10^{-9}$ atm cc/sec) compared to helium leak rates for prior art coated porous supports comprised of 3YSZ and walnut shell pore formers. FIGS. 4 and 5 are SEM micrographs (1000× magnification) which show greater pore uniformity and overall porous support layer microstructure uniformity when using a porous support comprised of 3YSZ with PMMA based pore forming material (FIG. 5) than a porous support comprised of 3YSZ and walnut shell pore formers (FIG. 4).

Figure 6:
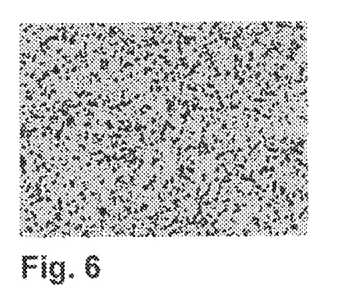
FIG. 6 is another SEM micrograph image at 2000× magnification showing a porous support layer comprised of 3YSZ with a polymethyl methacrylate (PMMA) based pore forming material in accordance with the present invention.
Figure 7:
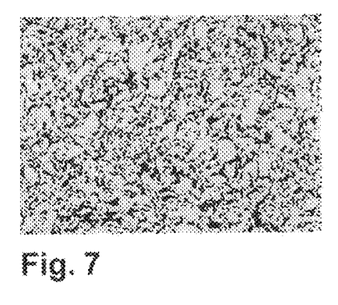
FIG. 7 is an SEM micrograph image at 2000× magnification showing a porous support layer comprised of 3YSZ with multi-modal particle sizes in accordance with the present invention.

FIG. 6 and FIG. 7 also show SEM micrographs (2000× magnification) of a porous support microstructure comprised of a single average particle size 3YSZ material with PMMA based pore forming material of 1.5 micron particle size (FIG. 6) and a porous support comprised of 3YSZ having different (e.g. bi-modal or multi-modal) average particle sizes (FIG. 7). Both porous support microstructures shown in FIGS. 6 and 7 exhibited higher strength, lower creep, and improved diffusion efficiency compared to a 3YSZ porous support having a single average particle size 3YSZ particle size and larger size walnut shell pore formers (see FIG. 4).

It has also been observed that the disclosed porous support layers 12, 12', 12" preferably have a permeability of between about 0.25 Darcy and about 0.5 Darcy. Standard procedures for measuring the permeability of a substrate in terms of Darcy number are outlined in ISO 4022. Porous support layers 12, 12', 12" also preferably have a thickness of between about 0.5 mm and about 4 mm and an average pore size diameter of no greater than about 50 microns. Additionally, the porous support layers also have catalyst particles 18, 18', 18" located within pores 20, 20', 20" and preferably adjacent to the intermediate porous layer for purposes of also promoting combustible substance oxidation. The presence of the catalyst particles both within the intermediate porous layer and within the porous support layer provides enhancement of oxygen flux and therefore generation of more heat via combustion that can be obtained by either providing catalyst particles within solely the intermediate porous layer or the porous support layer alone. It is to be noted that to a lesser extent, catalyst particles can also be located in region of the pores that are more remote from the intermediate porous layer, and therefore do not participate in promoting fuel oxidation. However, the bulk of catalyst in a composite oxygen transport element of the present invention is, however, preferably located in the intermediate porous layer and within the pores adjacent or proximate to the intermediate porous layer.

In forming a composite oxygen transport membrane element in accordance with the present invention, the porous support 12, 12', 12" is first formed in a manner known in the art and as set forth in the references discussed above. For example, standard ceramic extrusion techniques can be employed to produce a porous support layer or structure in a tube configuration in a green state and then subjected to a bisque firing at 1050° C. for about 4 hours to achieve reasonable strength for further handling. After bisque firing, the resulting tube can be checked or tested for targeted porosity, strength, creep resistance and, most importantly, diffusivity characteristics. Alternatively, a freeze cast supporting structure could be formed as discussed in "Freeze-Casting of Porous Ceramics: A Review of Current Achievements and Issues" (2008) by Deville, pp. 155-169.

After forming the green tube, intermediate porous layer 14, 14', 14" is then formed. A mixture of about 34 grams of powders having electronic and ionic phases, LSCMV and 10Sc1YSZ, respectively, is prepared so that the mixture contains generally equal proportions by volume of LSCMV and 10Sc1YSZ. Prior to forming the mixture, the catalyst particles, such as CGO, are so incorporated into the electronic phase LSCMV by forming deposits of such particles on the electronic phase, for example, by precipitation. However, it is more preferable to form the catalyst particles within the intermediate porous layer by wicking a solution containing catalyst precursors through the porous support layer towards the intermediate porous layer after application of the membrane active layers as described in more detail below. As such, there is no requirement to deposit particles of catalyst on the electronic phase. The electronic phase particles are each about 0.3 microns prior to firing and the catalyst particles are about 0.1 microns or less and are present in a ratio by weight of about 10 wt %. To the mixture, 100 grams of toluene, 20 grams of the binder of the type mentioned above, 400 grams of 1.5 mm diameter YSZ grinding media are added. The mixture is then milled for about 6 hours to form a slurry ($d_{50}$ of about 0.34 μm). About 6 grams of carbon black having a particle size of about d50=0.8 μm is then added to the slurry and milled for additional 2 hours. An additional 10 grams of toluene and about 10 grams of additional binder is added to the slurry and mixed for between about 1.5 and about 2 hours. The inner wall of the green tube formed above is then coated by pouring the slurry, holding once for about 5 seconds and pouring out the residual back to the bottle. The coated green tube is then dried and fired at 850° C. for 1 hour in air.

The dense layer 10, 10', 10" is then applied. A mixture weighing about 40 grams is prepared that contains the same powders as used in forming the intermediate porous layer, discussed above, except that the ratio between LSCMV and 10Sc1YSZ is about 40/60 by volume, 2.4 grams of cobalt nitrate {$Co(NO_3)_2 \cdot 6H_2O$}, 95 grams of toluene, 5 grams of ethanol, 20 grams of the binder identified above, 400 grams of 1.5 mm diameter YSZ grinding media are then added to the mixture and the same is milled for about 10 hours to form a slurry ($d_{50}$~0.34 μm). Again, about 10 grams of toluene and about 10 grams of binder are added to the slurry and mixed for about 1.5 and about 2 hours. The inner wall of the tube is then coated by pouring the slurry, holding once for about 10 seconds and pouring out the residual back to the bottle. The coated green tube is then stored dry prior to firing the layers in a controlled environment.

The coated green tube is then placed on a C-setter in a horizontal tube furnace and porous alumina tubes impregnated with chromium nitrate are placed close to the coated tube to saturate the environment with chromium vapor. The tubes are heated in static air to about 800° C. for binder burnout and, if necessary, the sintering environment is switched to an atmosphere of a saturated nitrogen mixture (nitrogen and water vapor) that contains about 4 percent by volume of hydrogen to allow the vanadium containing electronic conducting perovskite structured materials to properly sinter. The tube is held at about 1350° C. to 1430° C. for about 8 hours and then cooled in nitrogen to complete the sintering of the materials. The sintered tube is then checked for leaks wherein the helium leak rates should be lower than $10^{-7}$ Pa.

Surface exchange layer 16 is then applied. A mixture of powders is prepared that contains about 35 g of equal amounts of ionic and electronic phases having chemical formulas of $Zr_{0.80}Sc_{0.18}Y_{0.02}O_{2-\delta}$ and $La_{0.8}Sr_{0.2}FeO_{3-\delta}$, respectively. To this mixture, about 100 grams of toluene, 20 grams of the binder identified above, about 400 grams of 1.5 mm diameter YSZ grinding media are added and the resultant mixture is milled for about 14 hours to form a slurry ($d_{50}$~0.4 μm). About six grams of carbon black are added to the slurry and milled for additional 2 hours. A mixture of about 10 grams of toluene and about 10 grams of the binder are then added to the slurry and mixed for between about 1.5 and about 2 hours. The inner wall of the tube is then coated by pouring the slurry, holding twice for about 10 seconds and then pouring out the residual back to the bottle. The coated tube is then dried and fired at 1100° C. for two hours in air.

The structure formed in the manner described above is in a fully sintered state and the catalyst is then further applied by wicking a solution containing catalyst precursors in the direction of arrowhead B at the side of the porous support opposite to the intermediate porous layer. The solution can be an aqueous metal ion solution containing about 20 mol % $Gd(NO_3)_3$ and 80 mol % $Ce(NO_3)_3$. A pressure can be established on the side of the porous support layer to assist in the infiltration of the solution. In addition, the pores can first be evacuated of air using a vacuum to further assist in wicking of the solution and prevent the opportunity of trapped air in the pores preventing wicking of the solution all the way through the porous support layer to the intermediate porous layer. The resulting composite oxygen transport membrane 1 in such state can be directly placed into service or further fired prior to being placed into service so that the catalyst particles, in this case $Ce_{0.8}Gd_{0.2}O_{2-\delta}$ are formed in the porous support layer adjacent to the intermediate porous layer and as described above, within the intermediate porous layer itself. The firing to form $Ce_{0.8}Gd_{0.2}O_{2-\delta}$ would take place at a temperature of about 850° C. and would take about 1 hour to form the catalyst particles.

Although the present invention has been described with reference to a preferred embodiment, as will occur to those skilled in the art, changes and additions to such embodiment can be made without departing from the spirit and scope of the present invention as set forth in the appended claims.

The invention claimed is:

1. A composite oxygen transport membrane, said composite oxygen transport membrane comprising:
   a porous support layer comprised of an fluorite structured ionic conducting material having a porosity of greater than 20 percent and a microstructure exhibiting bi-modal, multi-modal or substantially uniform pore size distribution throughout the porous support layer;
   an intermediate porous layer capable of conducting oxygen ions and electrons to separate oxygen from an oxygen containing feed, the intermediate porous layer applied adjacent to the porous support layer and comprising a mixture of a fluorite structured ionic conductive material and electrically conductive materials to conduct the oxygen ions and electrons, respectively;
   a dense layer capable of conducting oxygen ions and electrons to separate oxygen from an oxygen containing feed, the dense layer applied adjacent to the intermediate porous layer and also comprising a mixture of a fluorite structured ionic conductive material and electrically conductive materials to conduct the oxygen ions and electrons, respectively; and
   catalyst particles or a solution containing precursors of the catalyst particles located in pores of the porous support layer and intermediate porous layer, the catalyst particles containing a catalyst selected to promote oxidation of a combustible substance in the presence of the separated oxygen transported through the dense layer and the intermediate porous layer to the porous support layer, wherein said catalyst is gadolinium doped ceria.

2. The composite oxygen transport membrane of claim 1, further comprising a porous surface exchange layer applied to the dense layer opposite to the intermediate porous layer.

3. The composite oxygen transport membrane of claim 1, wherein:
   the intermediate porous layer has a thickness of between 10 and 40 microns, a porosity of between 20 percent and 50 percent and an average pore diameter of between 0.5 and 3 microns;
   the dense layer has a thickness of between 10 and 50 microns;
   the porous surface exchange layer has a thickness of between 10 and 40 microns, a porosity of between 30 percent and 60 percent and a pore diameter of between 1 and 4 microns; and
   the porous support layer has a thickness of between 0.5 and 4 mm.

4. The composite oxygen transport membrane of claim 1, wherein: the intermediate porous layer contains a mixture of about 60 percent
   by weight of $(La_{0.825}Sr_{0.175})_{0.96}Cr_{0.76}Fe_{0.225}V_{0.015}O_{3-\delta}$ or $(La_{0.8}Sr_{0.2})_{0.95}Cr_{0.7}Fe_{0.3}O_{3-\delta}$ with the remainder 10Sc1YSZ or 10Sc1CeSZ, wherein 10Sc1YSZ is 10 mol % scandia, 1 mol % yttria stabilized zirconia, and 10Sc1CeSZ is 10 mol % scandia, 1 mol % ceria stabilized zirconia;
   the dense layer contains a mixture of about 40 percent by weight of $(La_{0.825}Sr_{0.175})_{0.94}Cr_{0.72}Mn_{0.26}V_{0.02}O_{3-\delta}$ or $(La_{0.8}Sr_{0.2})_{0.95}Cr_{0.5}Fe_{0.5}O_{3-\delta}$, with remainder 10Sc1YSZ or 10Sc1CeSZ;
   the porous surface exchange layer is formed by a mixture of about 50 percent by weight of $(La_{0.8}Sr_{0.2})_{0.98}MnO_{3-\delta}$ or $La_{0.8}Sr_{0.2}FeO_{3-\delta}$, remainder 10Sc1YSZ or 10Sc1CeSZ;
   the porous support layer has a thickness of between 0.5 and 4 mm and is formed from a mixture comprising 3YSZ and a polymethyl methacrylate based pore forming material.

5. The composite oxygen transport membrane of claim 1, wherein: the intermediate porous layer contains a mixture of about 60 percent
   by weight of $(La_uSr_vCe_{1-u-v})_wCr_xM_yV_zO_{3-\delta}$ where u is from 0.7 to 0.9, v is from 0.1 to 0.3 and (1-u-v) is greater than or equal to zero, w is from 0.94 to 1, x is from 0.5 to 0.77, M is Mn or Fe, y is from 0.2 to 0.5, z is from 0 to 0.03, and x+y+z=1, with the remainder $Zr_{x'}'Sc_{y'}'A_{z'}'O_{2-\delta}$, where y' is from 0.08 to 0.3, z' is from 0.01 to 0.03, x'+y'+z'=1 and A is Y or Ce or mixtures of Y and Ce, and the intermediate porous layer has a thickness of between 10 and 40 microns, and a porosity of between 25 percent and 40 percent;
   the dense layer contains a mixture of about 40 percent by weight of $(La_uSr_vCe_{1-u-v})_wCr_xM_yV_zO_{3-\delta}$ where u is from 0.7 to 0.9, v is from 0.1 to 0.3 and (1-u-v) is greater than or equal to zero, w is from 0.94 to 1, x is from 0.5 to 0.77, M is Mn or Fe, y is from 0.2 to 0.5, z is from 0 to 0.03, and x+y+z =1, with the remainder $Zr_{x'}'Sc_{y'}'A_{z'}'O_{2-\delta}$, where y' is from 0.08 to 0.3, z' is from 0.01 to 0.03, x'+y'+z'=1 and A is Y or Ce or mixtures of Y and Ce, and the dense layer has a thickness of between 10 and 50 microns;
   the porous surface exchange layer is formed by a mixture of about 50 percent by weight of $(La_{x'''}Sr_{1-x'''})_{y'''}MO_{3-\delta}$, where x''' is from 0.2 to 0.9, y''' is from 0.95 to 1, M is Mn or Fe, with the remainder $Zr_{x^{iv}}Sc_{y^{iv}}A_{z^{iv}}O_{2-\delta}$, where $y^{iv}$ is from 0.08 to 0.3, $z^{iv}$ is from 0.01 to 0.03, $x^{iv}+y^{iv}+z^{iv}=1$ and A is Y, Ce or mixtures of Y and Ce; and
   the porous support layer has a thickness of between 0.5 and 4 mm and is formed from 3YSZ.

6. The composite oxygen transport membrane of claim 1 made by the process comprising: fabricating a porous support layer comprised of an fluorite structured ionic conducting material, the fabricating step including a pore forming enhancement step such that the porous support layer has a porosity of greater than about 20 percent and a microstructure exhibiting bi-modal, multi-modal or substantially uniform pore size distribution throughout the porous support layer;
   applying an intermediate porous layer on the porous support layer, the intermediate porous layer capable of conducting oxygen ions and electrons to separate oxygen from an oxygen containing feed, the intermediate porous layer comprising a mixture of a fluorite structured ionic conductive material and electrically conductive materials to conduct the oxygen ions and electrons, respectively;
   applying a dense layer on the intermediate porous layer, the dense layer capable of conducting oxygen ions and electrons to separate oxygen from an oxygen containing feed, the dense layer also comprising a mixture of a fluorite structured ionic conductive material and electrically conductive materials to conduct the oxygen ions and electrons, respectively; and
   introducing catalyst particles or a solution containing precursors of the catalyst particles to the porous support layer and intermediate porous layer, the catalyst particles containing a catalyst selected to promote oxidation of a combustible substance in the presence of the separated oxygen transported through the dense layer and the intermediate porous layer to the porous support layer.

7. The composite oxygen transport membrane of claim 6 wherein the pore forming enhancement process comprises mixing a polymethyl methacrylate based pore forming material with the fluorite structured ionic conducting material of the porous support layer.

8. The composite oxygen transport membrane of claim 6 wherein the pore forming enhancement process comprises use of hollow spherical particles of the fluorite structured ionic conducting material of the porous support layer.

9. The composite oxygen transport membrane of claim 6, further comprising the step of applying a porous surface exchange layer to the dense layer opposite to the intermediate porous layer.

10. The composite oxygen transport membrane of claim 6, wherein the step of introducing catalyst particles or a solution containing precursors of the catalyst particles to the porous support layer and intermediate porous layer further comprises adding catalyst particles to the mixture of fluorite structured ionic conductive material and electrically conductive materials in the intermediate porous layer.

11. The composite oxygen transport membrane of claim 6, wherein the step of introducing catalyst particles or a solution containing precursors of the catalyst particles to the porous support layer and intermediate porous layer further comprises:
applying a solution containing catalyst precursors to the porous support layer on a side thereof opposite to the intermediate porous layer so that the solution infiltrates pores within the porous support layer and the intermediate porous layer with the solution containing catalyst precursors; and
heating the composite oxygen transport membrane after the solution containing catalyst precursors infiltrates the pores and to form the catalyst from the catalyst precursors.

12. A method of producing the catalyst containing composite oxygen transport membrane of claim 1, said method comprising:
forming a composite oxygen transport membrane in a sintered state, said composite oxygen transport membrane having a plurality of layers comprising a dense separation layer, a porous support layer, and an intermediate porous layer located between the dense separation layer and the porous support layer;
applying a solution containing catalyst precursors to the porous support layer on a side thereof opposite to the intermediate porous layer, the catalyst precursors selected to produce a catalyst capable of promoting oxidation of the combustible substance in the presence of the separated oxygen;
infiltrating or impregnating the porous support layer with the solution containing catalyst precursors so that the solution containing catalyst precursors wicks through the pores of the porous support layer and at least partially infiltrates or impregnates the intermediate porous layer; and
heating the composite oxygen transport membrane after infiltrating or impregnating the porous support layer and the intermediate porous layer such that the catalyst is formed from the catalyst precursors
wherein each of the dense separation layer and the intermediate porous layer are capable of conducting oxygen ions and electrons at an elevated operational temperature to separate oxygen from an oxygen containing feed;
wherein the dense separation layer and the intermediate porous layer comprising mixtures of a fluorite structured ionic conductive material and electrically conductive materials to conduct oxygen ions and electrons, respectively;
wherein the porous support layer comprises a fluorite structured ionic conducting material having a porosity of greater than about 20 percent and a microstructure exhibiting bi-modal, multi-modal, or substantially uniform pore size distribution throughout the porous support layer.

13. The method of claim 12, wherein the solution containing catalyst precursors is an aqueous metal ion solution containing 20 mol % $Gd(NO_3)_3$ and 80 mol % $Ce(NO_3)_3$ that when sintered forms $Gd_{0.8}Ce_{0.2}O_{2-\delta}$.

14. The method of claim 12, wherein the catalyst is gadolinium doped ceria.

15. The method of claim 12, wherein a pressure is established on the second side of the support layer to assist in the infiltration or impregnation of porous support layer and intermediate porous layer with the solution containing catalyst precursors or wherein the pores can first be evacuated of air using a vacuum to further assist in wicking of the solution containing catalyst precursors and prevent the opportunity of trapped air in the pores preventing or inhibiting wicking of the solution containing catalyst precursors through the porous support layer to the intermediate porous layer.

16. The method of claim 12, wherein the pores in the porous support layer are formed using a polymethyl methacrylate based pore forming material mixed with the fluorite structured ionic conducting material of the porous support layer.

17. The method of claim 12, wherein the pores in the porous support layer are formed using of hollow spherical particles of the polymethyl methacrylate based pore forming material or the fluorite structured ionic conducting material of the porous support layer.

18. The composite oxygen transport membrane of claim 1 which comprises a porous support layer having a microstructure exhibiting substantially uniform pore size distribution throughout the porous support layer.

19. The method of claim 12 wherein said composite oxygen transport membrane comprises a porous support layer having a microstructure exhibiting substantially uniform pore size distribution throughout the porous support layer.

* * * * *